Figure 1:
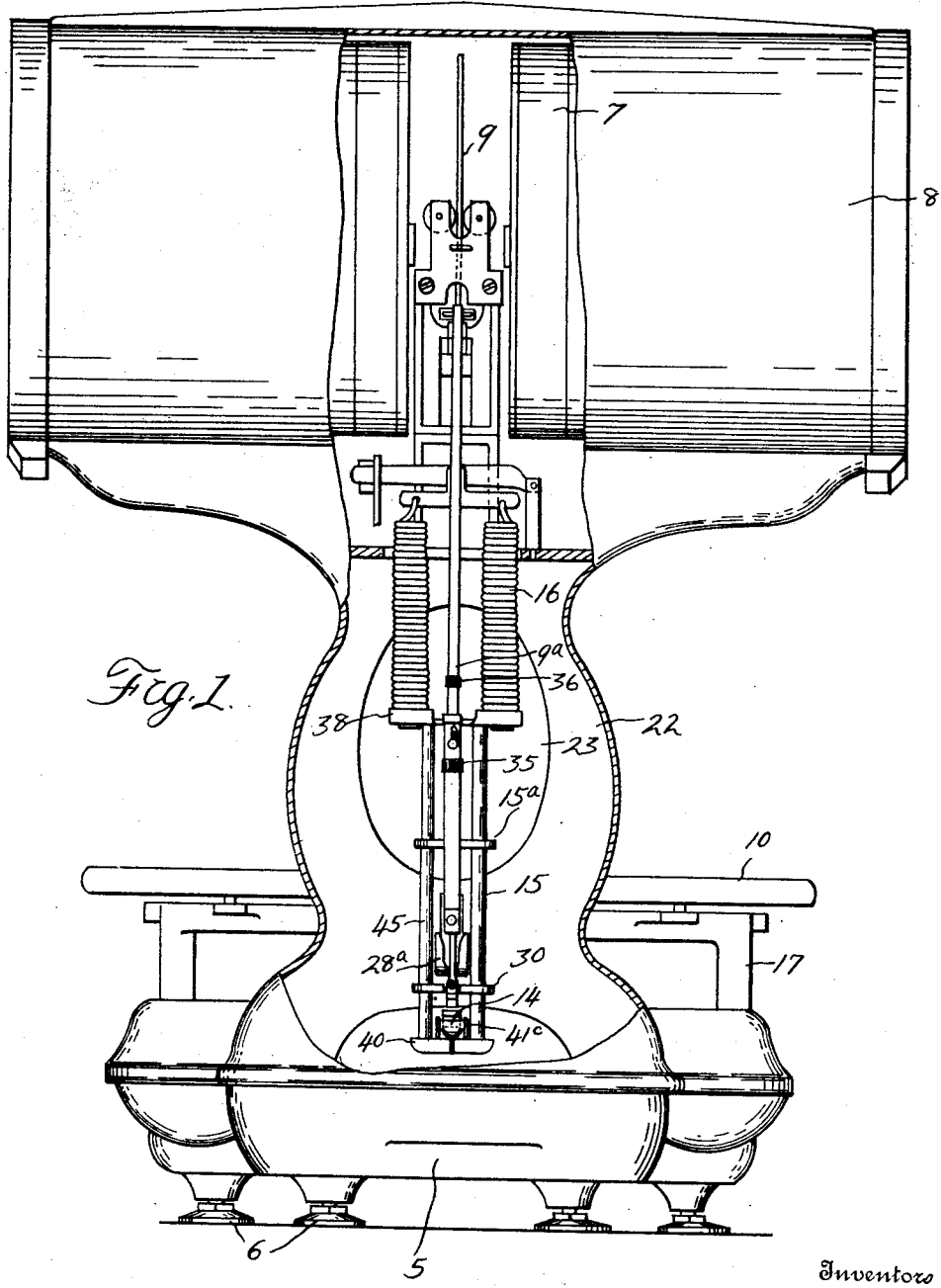

June 2, 1931. F. L. SESSIONS 1,808,261
WELDING MACHINE
Filed Jan. 5, 1927 5 Sheets-Sheet 1
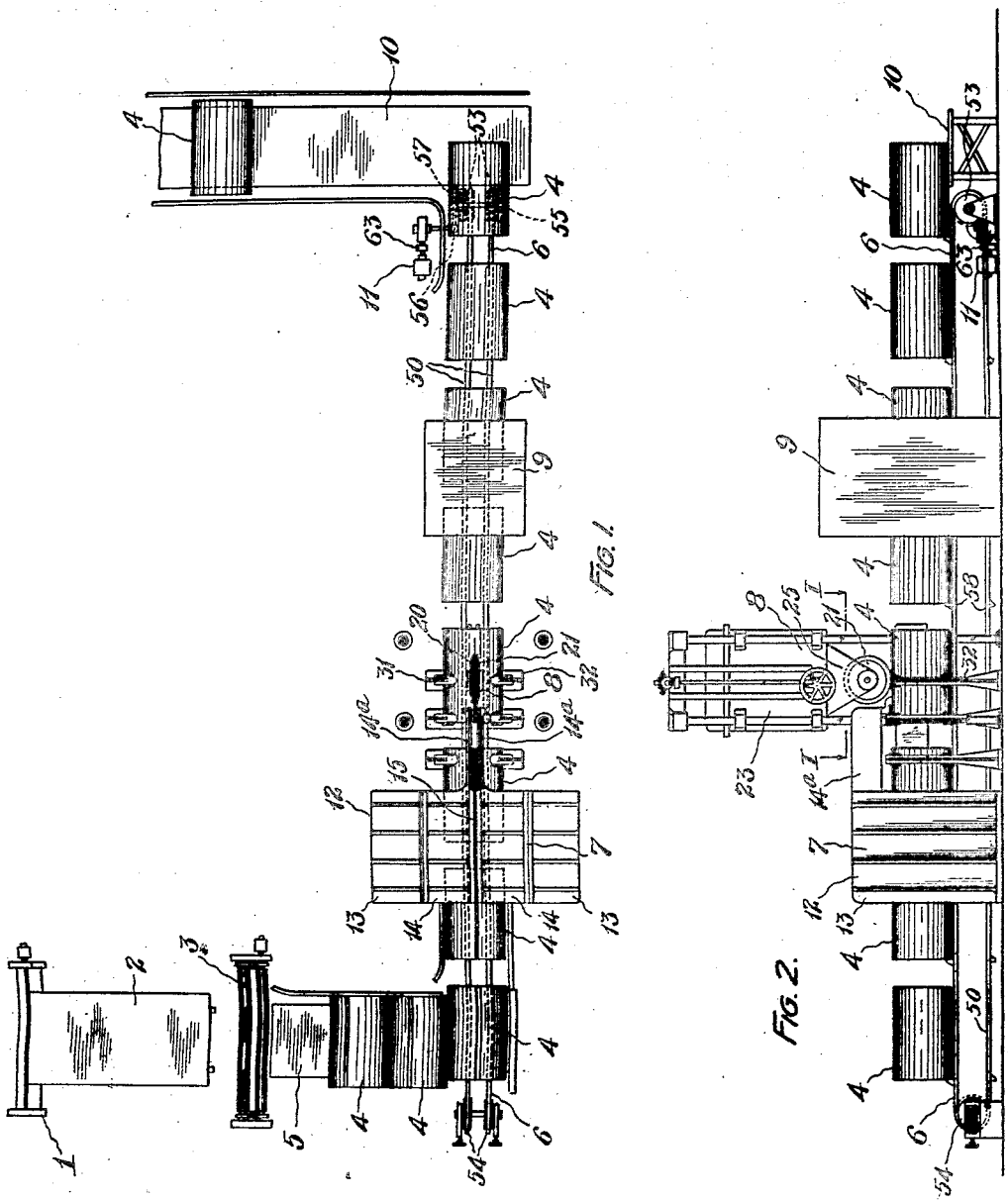
INVENTOR:

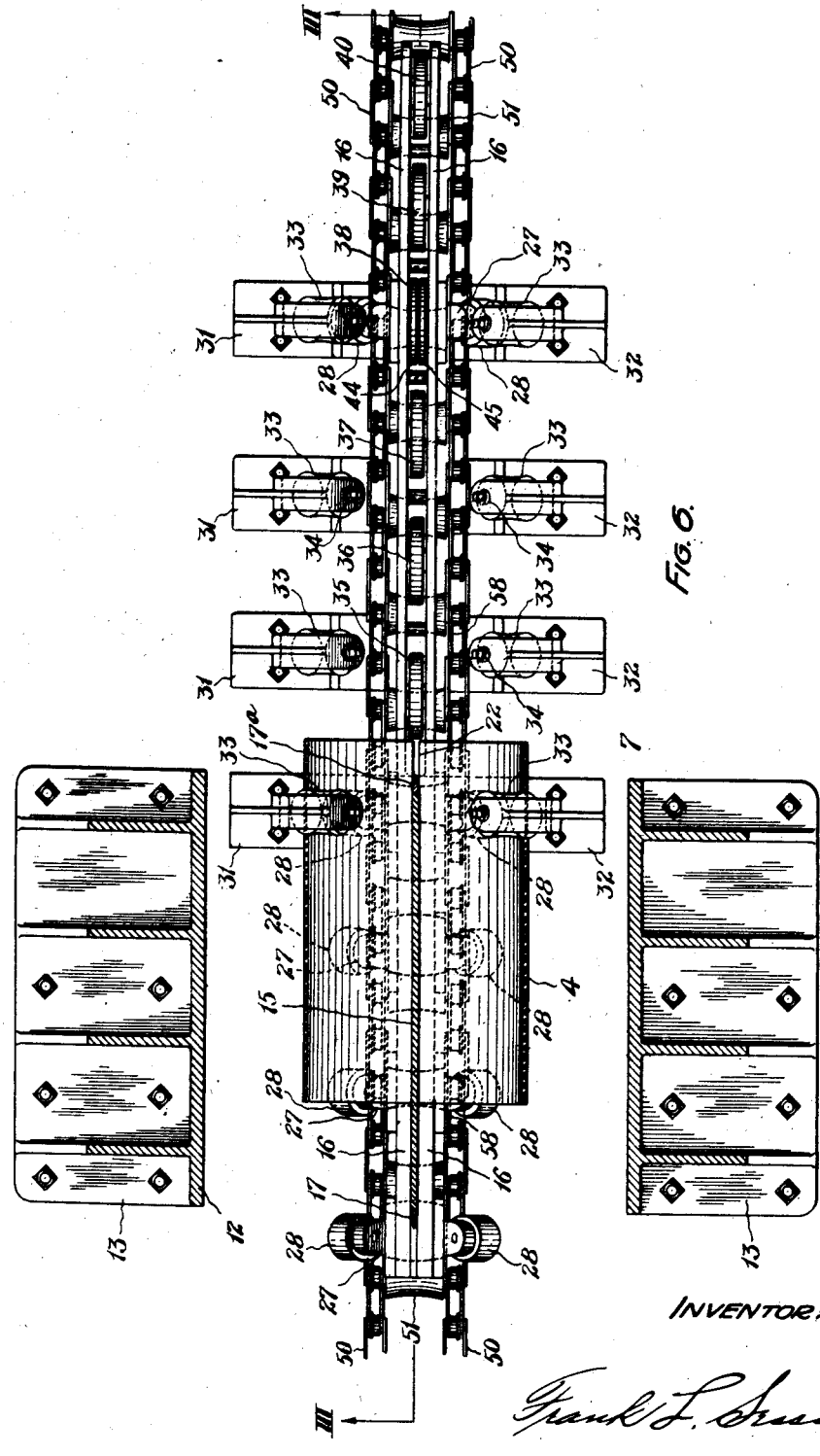

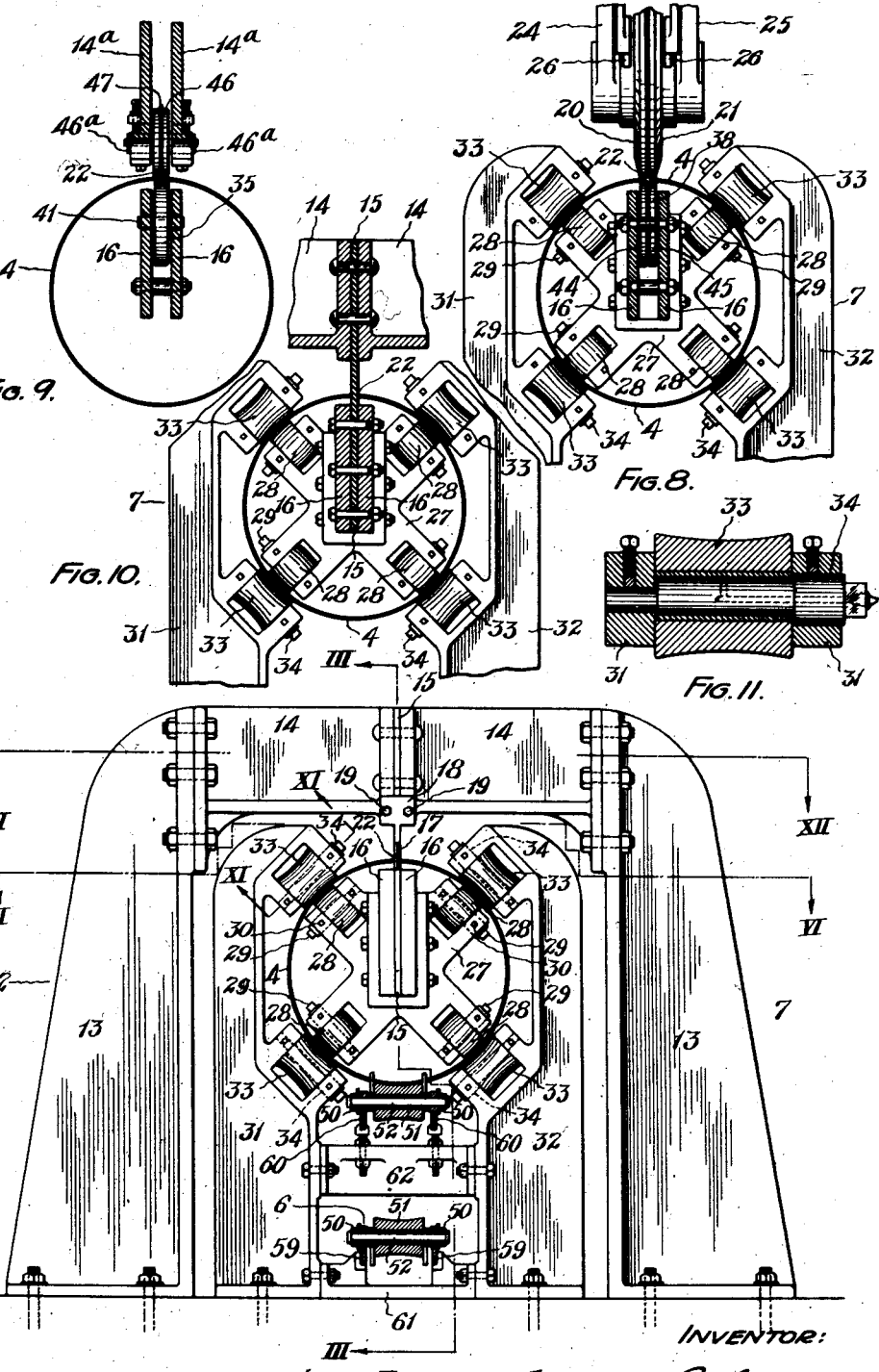

June 2, 1931.    F. L. SESSIONS    1,808,261
WELDING MACHINE
Filed Jan. 5, 1927    5 Sheets-Sheet 5
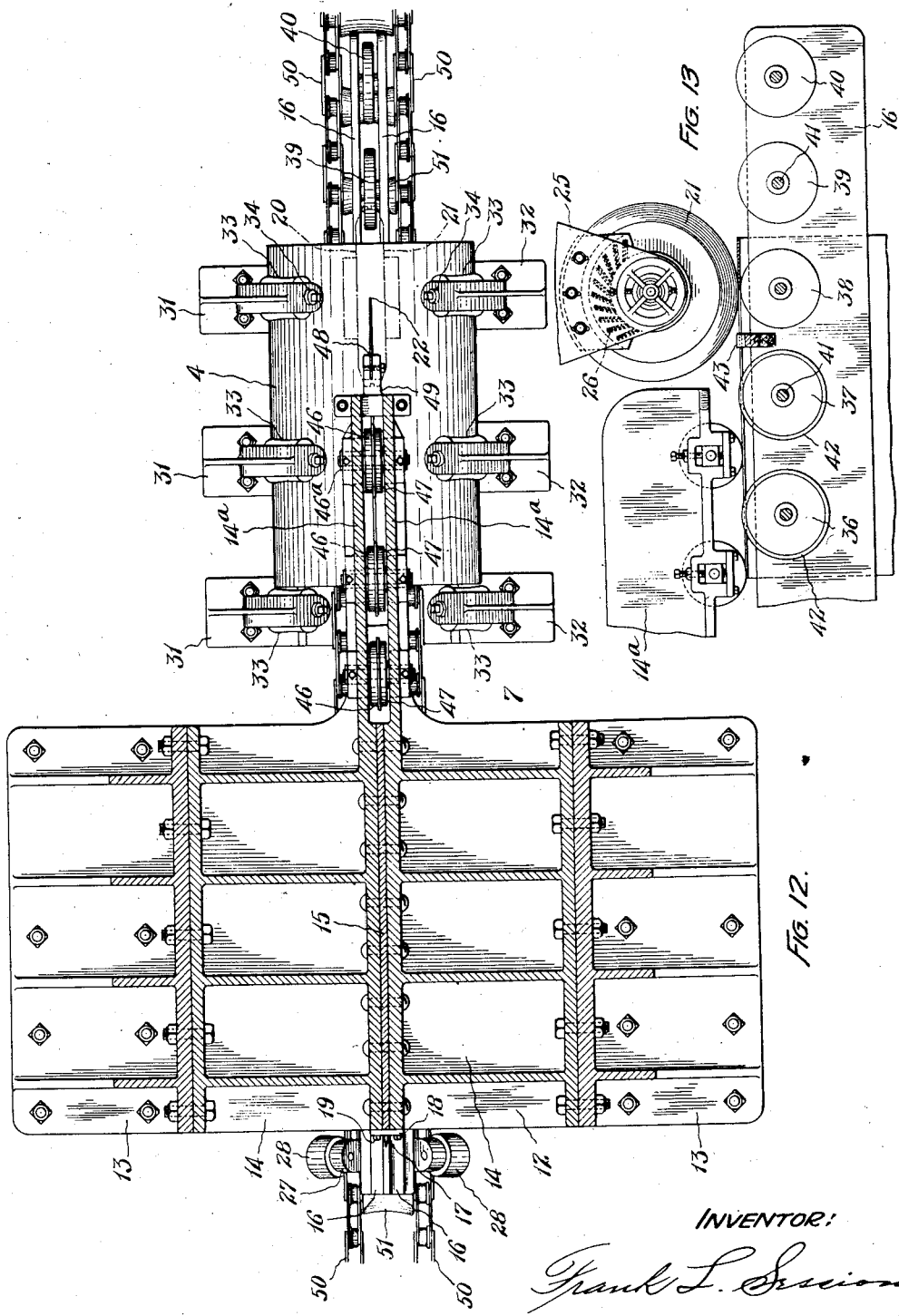
INVENTOR:
Frank L. Sessions Patented June 2, 1931

1,808,261

UNITED STATES PATENT OFFICE

FRANK L. SESSIONS, OF LAKEWOOD, OHIO

WELDING MACHINE

Application filed January 5, 1927. Serial No. 159,218.

My invention relates to apparatus for welding or otherwise sealing longitudinal seams in metal drums, barrels, cylinders or other sheet or plate metal hollow shells that are adapted to be traversed longitudinally past the welding or other seam closing device with their edges presented and maintained in accurate register or relative positions at the point where the seam closing device operates.
Among the objects of my invention are:—
The provision of means to receive metal shells having open longitudinal seams, to accurately position and align the seams with relation to the seam sealing device and to each other and traverse the shells, one after another, continuously in the same direction and without reversing the direction of movement past the seam sealing device; the provision of means for supporting the shells upon their interior surfaces during their transportation and while they are being sealed; the provision of means for causing the longitudinal seam of the shell to be progressively, accurately positioned in relation to the seam sealing device; the provision of means for supporting the shell as it is being traversed towards and past the seam sealing device; the provision of means for guiding the shell and maintaining its alignment during the traversing movement to and past the seam sealing device; and the provision of means for bringing the shells to and taking them away from the seam sealing device.
The foregoing and other objects are accomplished by the use of my invention described in this specification and shown in the accompanying drawings in which:
Fig. 1 is a plan view partly in plan section of a machinery layout, including a welding unit, embodying my invention.
Fig. 2 is a side elevation of the machinery shown in Fig. 1.
Fig. 3 is partly a section and partly a side elevation of a welding machine embodying my invention.
Fig. 4 is an enlarged cross section on line IV—IV of Fig. 3.
Fig. 5 is an enlarged cross section on line V—V of Fig. 3.
Fig. 6 is a plan section on line VI—VI of Fig. 3, the right-hand shell being omitted for the sake of clearness.
Fig. 7 is an end elevation on line VII—VII of Fig. 3.
Fig. 8 is a partial transverse vertical section on line VIII—VIII of Fig. 3.
Fig. 9 is a partial transverse vertical section on line IX—IX of Fig. 3.
Fig. 10 is a partial transverse vertical section on line X—X of Fig. 3.
Fig. 11 is a fragmentary section on line XI—XI of Fig. 7.
Fig. 12 is a plan section on line XII—XII of Figs. 3 and 7.
Fig. 13 is a fragmentary, central, longitudinal, vertical section showing modified forms of seam guides.
In Figs. 1 and 2 of the drawings there is shown a floor plan and elevation respectively of metal barrel forming and welding apparatus embodying my invention. In these figures the machines employed are shown only conventionally as their functions and operations are well understood by those skilled in the art. A squaring shear, shown at 1, may be employed for squaring and truing the edges of the sheets 2 which are to be formed into shells having longitudinal seams to be sealed. The sheets 2 pass through the bending rolls 3 where they are formed into open seam cylinders 4 which may be placed upon a runway or conveyor 5 upon which they may roll or be transported to the conveyor 6 which is adapted to receive and traverse them in longitudinal alignment through the positioning, guiding and supporting device 7, past the welding or other seam closing device 8 and, if desired, through or past other machines or apparatus, as for instance a grinding machine 9 that may perform its operations upon the sealed seam while it is moving longitudinally. The finished shells may, if desired, be deposited by the conveyor 6 upon another conveyor or runway 10 which may be provided to take them to their next destination. Suitable means, such as a motor 11, may be employed for driving the conveyor 6. It will be understood that the conveyors or runways 5 and 10 may be made of any length for the

Exterior supports for the work shells may consist of standards 31, 32, disposed upon opposite sides of the path of movement of the shells and carrying suitable work supporting and guiding devices, such as the rollers 33 which, like rollers 28, may be mounted upon adjustable eccentric bearing pins 34 similar in every way to the bearing pins 29 which are used for supporting the rollers 28.

By adjusting the rolls 28 and 33 by means of the eccentric bearing pins 29 and 34, the work may be properly positioned and the edges of the seam-cleft be pressed together to effect the welding of the seam as it passes progressively through the welding point.

It will be understood that any other suitable means for the adjustment of either the interior or exterior work supporting rolls may be employed and that the character, number and dimensions of the work supports may be varied as may be desired or necessary for supporting the work.

For further supporting and guiding the work, bars 16 may be spaced apart to receive suitable guiding and carrier rolls 35, 36, 37, 38, 39 and 40 revolubly mounted upon bearing pins 41, which may be made adjustable in any known manner to vary the height the rolls project above the top of the bar 16.

As shown in Fig. 13, rolls 35, 36, 37 which support the shell before the seam is sealed may, if desired, be provided with guiding fins 42 to enter the unsealed seam of the work as it approaches the seam sealing device. A stationary guide in the form of a thin plate or blade 43 may be carried by the bars 16 closely adjacent to the seam sealing point, if desired. When the electrodes 20, 21 are used as shown in the drawings, the roll 38 should be made either of insulating material or of two separated metal discs 44, 45 as shown in Fig. 8, which are preferably insulated from each other and from the bars 16.

Other work guiding rolls 46 may be carried in suitable bearing supports by the arms 14a and these rolls may have seam guiding fins 47, if desired. A stationary seam guide 48 in the form of a plate or blade supported in a bracket 49 mounted for lateral adjustments upon arms 14a may be employed if desired. It will be understood that either guide 43 supported by bars 16 or guide 48 supported by arms 14a may be employed without the other. Guide 43 has the advantage that it may be set closer to the seam sealing point than guide 48 while guide 48 has the advantage that it may be more readily adjusted laterally of the seam than guide 43. It will be understood any desired ones of the rolls 35, 36, 37 and 46 may be provided with the seam guides 42 or 47. It is desirable that each shell as it approaches the seam sealing point shall have its seam guided at least at two separate points in a straight line with the seam sealing point in order that the work may be properly presented to and guided past the seam sealing device.

The rollers 46 may be mounted in adjustable bearings 46a in known manner as shown in Fig. 4.

For traversing the work shells through the guiding and supporting apparatus to the seam sealing device and past that device if desired, any suitable means may be employed. In the drawings there is shown a pair of parallel spaced apart endless chains 50 having rollers 51 revolubly mounted upon cross pins 52 extending between the chains. The chains are carried upon driving sprockets 53 and idler sprockets 54. The shaft 55 on which the driving sprockets 53 are mounted may be driven in any suitable manner as by means of the motor 11 which may be geared to the shaft 55 by means of suitable gearing including the pinion 56 and gear 57. At suitable spaced apart points on the chains 50 work engaging attachments 58 may be secured which are adapted to engage the work shells and push them along through the guiding, supporting and seam sealing devices and further past any other devices or machines that may be employed in alignment with the seam sealing device.

The lower reach of the chain 50 may be supported upon guide rails 59 while the upper reach of the chain may be supported upon guide rails 60, all of which guide rails may be carried by suitable supports such as the cross bars in 61, 62, which may be secured to the exterior guide supporting standards 31, 32.

It will be understood that the traversing movement of the work may be stopped and started as often as desired by stopping the motor or by the use of any known means such as a releasable shaft clutch at the point 63 in the transmission gearing of the motor 11, Fig. 1. Such starting and stopping of the work may be desirable in case the seam sealing device be adapted to traverse the work during the seam sealing operation while the work remains stationary.

It will be seen that by the use of my invention metal barrels, drums, range boilers, heaters, or other metal shells may be economically and expeditiously moved, supported and guided to and past the seam sealing device, the work moving always in the same direction and the direction of its movement never being reversed, the unclosed shells approaching from one side of the seam sealing device and the sealed shells leaving the other side. This is made possible largely by providing the thin plate work-guide 15 which forms the support for the central bars 16 and the interior work supporting devices, and by combining the various parts of the machine to co-act for the purposes of guiding, supporting and moving the work in the orderly manner necessary for accomplishing the objects of my invention.

I claim:—

1. In apparatus of the class described, a support, an elongated depending work guiding plate secured to said support and extending therefrom into the path of movement of the work, work supporting means carried by said plate comprising a runway bar, said bar provided with groups of circumferentially spaced adjustably mounted positioning rollers, said rollers adapted to engage the interior surface of and support the work at circumferentially spaced points and means for traversing a metal shell having a longitudinal open seam past said support with the edges of said seam separated and guided by said plate.

2. In apparatus of the class described, a support, a work positioning and guiding plate secured to said support and extending therefrom into the path of movement of the work, a work supporting bar secured to said plate and extending therefrom longitudinally in the path of movement of the work, seam guiding means secured to said bar in alignment with said plate adapted to engage and guide the edges of the open longitudinal seam of a metal shell that has been positioned by said plate, and means for traversing a metal shell longitudinally past said plate and along said supporting bar past said seam guiding means.

3. In apparatus of the class described, a support, a work guiding plate secured to said support and extending therefrom into the path of movement of the work, means for traversing a metal shell having a longitudinal open seam past said support with the edges of said seam separated and guided by said plate, a work supporting bar secured to said plate and extending therefrom longitudinally in the path of movement of the work, seam guiding means adapted to engage and guide said seam edges as said shell is moved beyond said plate, and means for sealing said edges at a point removed from said seam guiding means in the direction of movement of said shell.

4. In apparatus of the class described, a support, a work guiding plate secured to said support and extending therefrom into the path of movement of the work, means for traversing a metal shell having a longitudinal open seam past said support with the edges of said shell separated and guided by said plate, an internal work-support carried by said plate engaging the inner surface of said shell, an external work-support engaging the outer surface of said shell, a seam guide adapted to engage the edges of the seam at a point removed from said plate in the direction of movement of said shell and means for sealing said edges at a point removed from said seam guide in the direction of movement of said shell.

5. A machine for moving and supporting an open longitudinal seam metal cylinder comprising a frame, a plate suspended from said frame, a detachable entering blade at the front end of said plate, internal cylinder-guiding and supporting means supported by said plate comprising a runway bar, groups of circumferentially spaced supporting and positioning rollers mounted on said bar adapted to engage the interior surface of said cylinder, guiding and carrier rolls mounted on said bar beyond the rear end of said plate, external cylinder-guiding and supporting means comprising groups of circumferentially spaced rollers adapted to engage the exterior surface of said cylinder after said cylinder has progressed beyond said internal groups of circumferentially spaced rollers, and means for moving said cylinder while supported by said interior and exterior guiding and supporting means in a direction parallel to its seam.

6. In apparatus for sealing longitudinal seams in metal cylinders a frame, an elongated plate supported by said frame adapted to engage the edges of said seams at widely spaced points, internal work-supporting means attached to said plate, external work-supporting means, seam-guiding and positioning means in alinement with said plate in the path of movement of the work beyond said plate, seam-sealing means and means for causing relative traversing movement of the work and said seam-sealing means.

7. Apparatus for sealing the seams of metal shells comprising a frame, a plate supported by said frame and extending downwardly therefrom, internal shell-supporting rolls mounted on an arm supported by said plate within the path of the work, external shell-supporting rolls spaced radially from said internal rolls and adapted to co-act with said internal rolls to support and guide the work, said external rolls being adjustable radially of said shell, an endless chain having spaced-apart projections adapted to engage the edge of said shell, an arm extending out from said frame outside the path of the work in the direction of travel of said shell, seam-guiding means supported by said arm, seam-sealing means adjacent said seam-guiding means, and means for driving said endless chain in a direction to move said shells by said supporting rolls past said seam-guide and seam-sealing means.

8. In apparatus for sealing the seams of metal shells, an elongated depending seam-guiding and internal-roll supporting-plate attached to an overhanging supporting-frame, a plurality of rolls carried by said supporting plate adapted to engage the inner surfaces of said shells, supplementary seam-guiding means attached to said frame, seam-sealing means and means for traversing said metal shells past said seam-sealing means.

9. In apparatus of the class described, a support, a depending, elongated plate-like member secured to said support and extending therefrom into the path of movement of the work and adapted to engage and guide the separated edges of the work in a straight line, said plate-like member having interior work supporting means carried by it and extending longitudinally in the path of movement of the work beyond the place where said plate-like member is secured to said support, seam guiding means relatively thinner than said plate-like member positioned to enter the seam between said separated edges after the advancing end of the work has passed beyond said plate-like member, and means for traversing a metal shell having a longitudinal open seam past said support with the edges of said seam separated and guided by said plate.

10. In apparatus of the class described, a supporting frame having a depending elongated plate-like member secured thereto extending longitudinally in the plane of movement of the work adapted to engage the edges of the open longitudinal seam thereof to cause said edges to travel in a straight line and hold said edges separated at the forward end of the advancing work to permit said edges to straddle and be guided by a second seam guide, a second seam guide in alignment with said plate-like member positioned to enter said held-open seam, interior work supporting means carried by said plate-like member, and guiding and supporting means disposed outside of the space occupied by the work adapted to engage the outer surface thereof.

11. In apparatus for the continuous sealing of the seams of metal shells, a seam-guiding and internal shell-supporting device, comprising a suspended runway bar, feeding means to continuously transport metal shells to and encompass said device, a supplementary seam guide, seam-sealing means, and means to remove completed shells from the apparatus.

12. In a machine for continuously welding longitudinal seam edges of cylinders, the combination of a frame, means for moving the open seam cylinders in tandem arrangement continuously through the machine, a welder at the output end of the machine, guiding means engaging the seam edges extending from the input end of the machine towards said welder and embodying a flat plate elongated in the direction of the seam and secured to said frame, this plate being positioned to lie between the seam edges of the cylinder as they pass and being extended into the interior of the cylinder, an elongated member attached to this plate within the space enclosed by the passing cylinders and extending to a point adjacent to the welder, and roll means carried by said elongated member and positioned to engage the interior walls of the cylinders as they pass.

13. In a machine for continuously welding longitudinal seam edges of cylinders, the combination of a frame, means for moving the open seam cylinders in tandem arrangement continuously through the machine, a welder at the output end of the machine, guiding means engaging the seam edges extending from the input end of the machine towards said welder and embodying a flat plate elongated in the direction of the seam and secured to said frame, this plate being positioned to lie between the seam edges of the cylinder as they pass and being extended into the interior of the cylinder, an elongated member attached to this plate within the space enclosed by the passing cylinders and extending to a point adjacent to the welder, roll means carried by said elongated member and positioned to engage the interior walls of the cylinder as they pass and additional roll means arranged to bear upon and guide the cylinders exteriorly.

14. In a machine for continuously welding longitudinal seam edges of cylinders the combination of a frame, means for moving an open seam cylinder continuously through the machine, a welder at the output end of the machine, guiding means engaging the seam edges extending from the input end of the machine towards said welder and embodying a flat plate elongated in the direction of the seam and secured to said frame, this plate being positioned to lie between the seam edges of the cylinder as they pass and being extended into the interior of the cylinder, a guiding roll supported exteriorly of said cylinder, having its axes transverse to the axis of the cylinder and being provided with a seam edge separating and guiding fin positioned to lie between the seam edges of the cylinder at a point between said plate and said welder, an elongated member attached to the edge of said plate within the space enclosed by the passing cylinder and extending to a point adjacent to the welder, and roll means carried by said elongated member positioned to engage the interior wall of the cylinder as it passes.

FRANK L. SESSIONS.